United States Patent
Ren et al.

(10) Patent No.: US 8,778,290 B1
(45) Date of Patent: Jul. 15, 2014

(54) COMPACT EXHAUST GAS TREATMENT SYSTEMS FOR DIESEL APPLICATIONS

(71) Applicant: GM Global Technology Operations LLC, Detroit, MI (US)

(72) Inventors: Shouxian Ren, Ypsilanti, MI (US);
Rahul Mital, Rochester Hills, MI (US);
James B Rodgers, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/848,109

(22) Filed: Mar. 21, 2013

(51) Int. Cl.
*B01D 53/94* (2006.01)
*F01N 3/20* (2006.01)
*F01N 3/28* (2006.01)

(52) U.S. Cl.
USPC ............ 423/213.2; 423/213.5; 423/213.7; 60/274; 60/299; 60/301

(58) Field of Classification Search
USPC .......... 423/213.2, 213.5, 213.7; 60/274, 299, 60/301
See application file for complete search history.

(56) References Cited

U.S. PATENT DOCUMENTS

| 8,479,500 B2 * | 7/2013 | Ren et al. ............... 60/297 |
| 2012/0258015 A1 | 10/2012 | Ren et al. |

* cited by examiner

*Primary Examiner* — Timothy Vanoy
(74) *Attorney, Agent, or Firm* — Quinn Law Group, PLLC

(57) ABSTRACT

An exhaust gas treatment system includes a SCR device and a DOC converter disposed upstream of the SCR device. A DEF dosing system includes an injector disposed upstream of the DOC converter for injecting ammonia reductant into the flow of exhaust gas upstream of the DOC converter. The DOC converter includes a corrugated metallic substrate having an ammonia-neutral oxidation catalyst compound that is operable to oxidize hydrocarbons and carbon monoxide in the flow of exhaust gas, while not reacting with the ammonia reductant in the flow of exhaust gas. The ammonia-neutral oxidation catalyst compound allows the ammonia reductant in the flow of exhaust gas to pass through the DOC converter, for reaction with a selective catalytic reduction composition in the SCR device.

19 Claims, 2 Drawing Sheets

COMPACT EXHAUST GAS TREATMENT SYSTEMS FOR DIESEL APPLICATIONS

TECHNICAL FIELD

The invention generally relates to an exhaust gas treatment system for a diesel engine.

BACKGROUND

Vehicular exhaust gas treatment systems are used to treat the exhaust gas from an engine of the vehicle. The exhaust gas emitted from a diesel engine, is a heterogeneous mixture that contains gaseous emissions such as carbon monoxide ("CO"), unburned hydrocarbons ("HC") and oxides of nitrogen ("$NO_X$") as well as condensed phase materials (liquids and solids) that constitute particulate matter. Catalyst compositions, typically disposed on catalyst supports or substrates that are disposed within the exhaust gas treatment system are provided to convert certain or all of these exhaust gas constituents into non-regulated exhaust gas components. For example, diesel exhaust gas treatment systems may include one or more of a precious metal containing diesel oxidation catalyst ("DOC") converter for the reduction of CO and excess HC, a selective catalytic reduction ("SCR") device for the reduction of $NO_X$ with the assistance of a diesel exhaust fluid ("DEF"), and a diesel particulate filter ("DPF") device for the removal of particulate matter. When periodic regeneration (or soot oxidation) is required, the DOC will oxidize injected diesel fuel, i.e., hydrocarbons, to generate an exothermic reaction to burn off the accumulated soot inside the DPF. The exhaust system requires a hydrocarbon mixer upstream of the DOC and a DEF mixer upstream of the SCR to provide more uniform reductant distribution of the hydrocarbons and the DEF respectively for effective DOC and SCR operations.

Exhaust gas treatment systems, such as described above, are particularly well suited for treating exhaust gas from diesel engines. However, such complex exhaust gas treatment systems are difficult to package into passenger cars, light duty pick-up trucks, and vans due to limited packaging space available.

SUMMARY

An exhaust gas treatment system for a diesel engine is provided. The exhaust gas treatment system includes an exhaust gas conduit in fluid communication with the diesel engine. The exhaust gas conduit is configured to receive a flow of exhaust gas from the diesel engine. A Selective Catalytic Reduction (SCR) device includes an inlet and an outlet in fluid communication with the exhaust gas conduit. The SCR device includes a selective catalytic reduction composition for reducing oxides of nitrogen ($NO_X$) in the flow of exhaust gas in the presence of an ammonia reductant. A Diesel Oxidation Catalyst (DOC) converter includes an inlet and an outlet in fluid communication with the exhaust gas conduit. The DOC converter is disposed upstream of the SCR device in the exhaust gas conduit. A Diesel Exhaust Fluid (DEF) dosing system includes an injector in fluid communication with the exhaust gas conduit. The injector is disposed upstream of the DOC converter in the exhaust gas conduit. The DEF dosing system is operable to inject ammonia reductant into the flow of exhaust gas upstream of the DOC converter. The DOC converter includes an ammonia-neutral oxidation catalyst compound that is operable to oxidize hydrocarbons and carbon monoxide in the flow of exhaust gas, while not reacting with the ammonia reductant in the flow of exhaust gas. The ammonia-neutral oxidation catalyst compound allows the ammonia reductant in the flow of exhaust gas to pass through the DOC converter, for reducing $NO_X$ over the selective catalytic reduction composition in the SCR device.

A method of treating exhaust gas from a diesel engine is also provided. The method includes injecting ammonia reductant into a flow of exhaust gas upstream of a DOC converter. The DOC converter includes an ammonia-neutral oxidation catalyst compound that is operable to oxidize hydrocarbons and carbon monoxide in the flow of exhaust gas, while not reacting with the ammonia reductant in the flow of exhaust gas. The ammonia-neutral oxidation catalyst compound allows the ammonia reductant to pass through the DOC converter. The ammonia reductant in the flow of exhaust gas reacts with a selective catalytic reduction composition in a SCR device. The selective catalyst reduction device is disposed downstream of the DOC converter to reduce $NO_X$ in the flow of exhaust gas.

Accordingly, the ammonia reductant, i.e., a DEF solution, is injected into the flow of exhaust gas upstream of the DOC converter. The DOC converter operates to mix, vaporize, and possibly provide hydrolysis to the ammonia reductant, upstream of the SCR device, to achieve efficient $NO_X$ reduction in the SCR device. As a result, the length of the exhaust gas treatment system for mixing the ammonia reductant with the flow of exhaust gas is significantly reduced, thereby allowing the exhaust gas treatment system to be used in smaller vehicles, such as passenger cars, light duty pick-up trucks, or vans.

The above features and advantages and other features and advantages of the present invention are readily apparent from the following detailed description of the best modes for carrying out the invention when taken in connection with the accompanying drawings.

DETAILED DESCRIPTION

Figure 1:
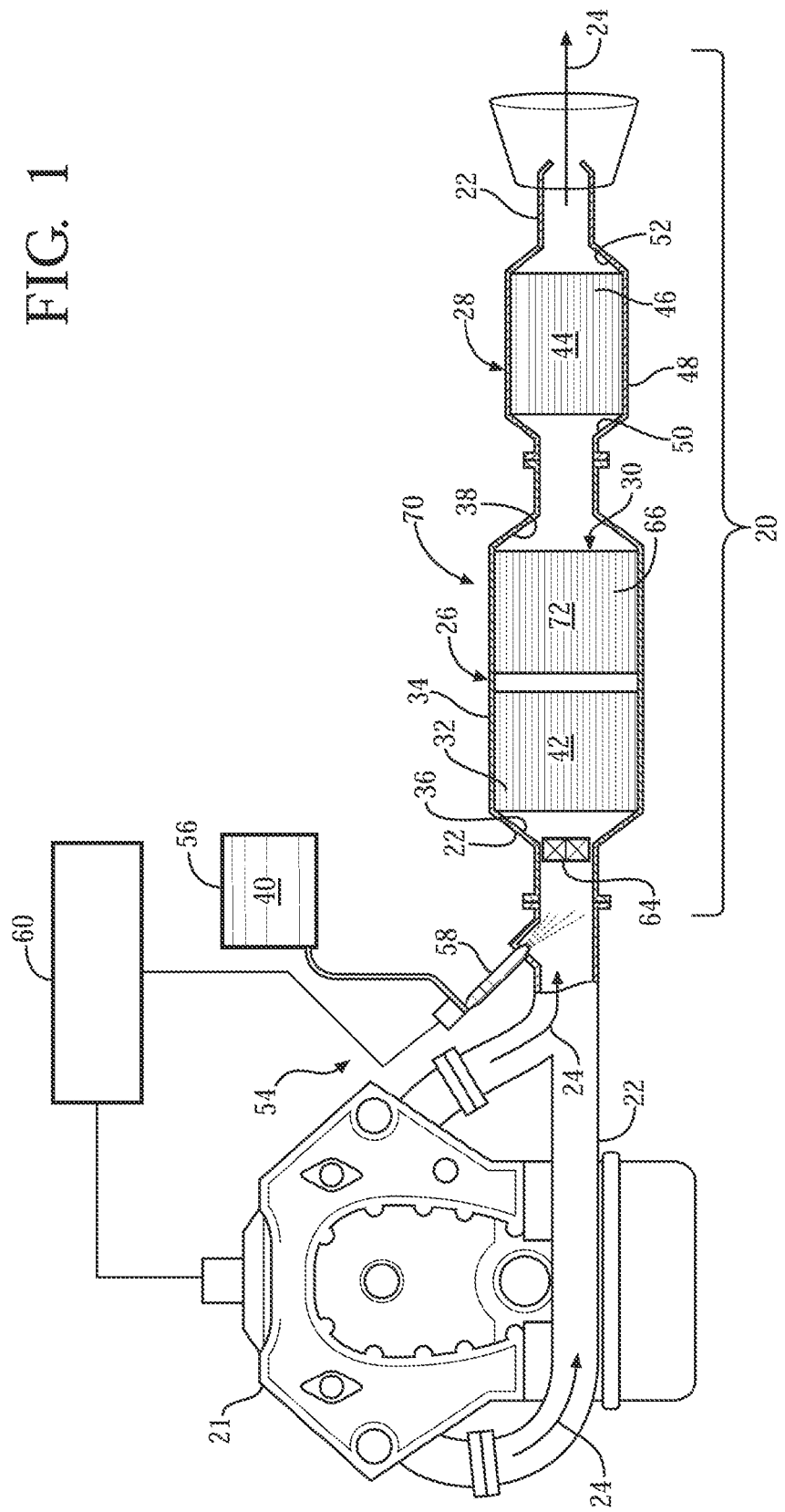
FIG. 1 is a schematic diagram of an exhaust gas treatment system for a diesel engine.

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Referring to the Figures, wherein like numerals indicate like parts throughout the several views, an exhaust gas treatment system is generally shown at 20. The exhaust gas treatment system 20 treats the regulated exhaust gas constituents of a diesel engine 21.

The exhaust gas treatment system 20 includes an exhaust gas conduit 22, which may comprise several segments that function to transport exhaust gas, generally indicated by arrows 24, from the diesel engine 21 to and between various exhaust treatment devices (to be described in detail below) of the exhaust gas treatment system 20. The exhaust treatment devices include, but are not limited to, a Diesel Oxidation Catalyst (DOC) converter 26, a Selective Catalyst Reduction (SCR) device 28, and a Diesel Particulate Filter (DPF) device 30.

The DOC converter 26 is disposed upstream of the SCR device 28 in the exhaust gas conduit 22. The DOC converter 26 includes a flow-through substrate 32 that is packaged in a rigid canister 34 between an inlet 36 and an outlet 38 of the DOC converter 26. The substrate 32 of the DOC converter 26 is preferably operable to mix and vaporize a Diesel Exhaust Fluid (DEF) containing an ammonia ($NH_3$) reductant 40 that is injected into the flow of exhaust gas prior to the ammonia reductant 40 reaching the SCR device 28. The substrate 32 of the DOC converter 26 may include a corrugated metallic substrate 32 suitable for use in a catalytic converter to facilitate the mixing and vaporization of the ammonia reductant 40 with the exhaust gas in the DOC converter 26.

The inlet 36 and the outlet 38 of the DOC converter 26 are in fluid communication with exhaust gas conduit 22, and facilitate the flow of exhaust gas through the DOC converter 26. The DOC converter 26 includes an ammonia-neutral oxidation catalyst compound 42 disposed on the substrate 32 of the DOC converter 26. The ammonia-neutral oxidation catalyst compound 42 may include palladium (Pd), base metals (Ce, Cu, Mo, Fe, Mn, La etc.), alkali metals (Na, K), or any combination of palladium, base metals and alkali metals. The DOC converter 26 treats unburned gaseous and non-volatile hydrocarbons and carbon monoxide that are emitted from the engine as part of the exhaust gas, or are intentionally injected into the exhaust gas via an in-cylinder post fuel injection process or an in-exhaust hydrocarbon injection process.

The ammonia-neutral oxidation catalyst compound 42 oxidizes the hydrocarbons and carbon monoxide in the exhaust gas, in an exothermic reaction, to form carbon dioxide and water, while not reacting with the ammonia reductant 40 in the flow of exhaust gas to allow the ammonia reductant 40 to pass through the DOC converter 26 for reaction with a selective catalytic reduction composition 44 in the SCR device 28. The heat from the exothermic reaction of the DOC converter 26 may be used to heat the exhaust gas to a temperature sufficient to regenerate the DPF device 30, i.e., to burn off accumulated soot in the DPF device 30.

The SCR device 28 is disposed downstream of the DOC converter 26. The SCR device 28 includes a flow-through substrate 46 that is packaged in a rigid canister 48 between an inlet 50 and an outlet 52 of the SCR device 28. The inlet 50 and the outlet 52 of the SCR device 28 are in fluid communication with exhaust gas conduit 22, and facilitate the flow of exhaust gas through the SCR device 28. The SCR device 28 includes the selective catalytic reduction composition 44 disposed on the substrate 46 of the SCR device 28. The selective catalytic reduction composition 44 preferably contains a zeolite and one or more base metal components such as iron (Fe), cobalt (Co) or copper (Cu) which can operate efficiently to convert oxides of nitrogen ($NO_x$) constituents in the exhaust gas in the presence of the ammonia reductant 40, such as but not limited to ammonia ($NH_3$). In addition, the selective catalytic reduction compound may be vanadia/titania based, platinum based or a combination thereof. Other vanadia free formulations (e.g. acidic zirconia) may also be used.

The ammonia reductant 40 may be supplied by a DEF dosing system 54. The DEF dosing system 54 may include a reductant supply tank 56 that is in fluid communication with a reductant injector 58. The reductant injector 58 is in fluid communication with the exhaust gas conduit 22, and is disposed upstream of the DOC converter 26 in the exhaust gas conduit 22. The DEF dosing system 54 is operable to inject the ammonia reductant 40, via the reductant injector 58, into the flow of exhaust gas upstream of the DOC converter 26. The ammonia reductant 40 may be in the form of a gas, a liquid or an aqueous urea solution. The ammonia reductant 40 may be mixed with air in the reductant injector 58 to aid in the dispersion of the injected spray. A controller 60, such as a powertrain or a vehicle controller 60, controls the injection of the ammonia reductant 40 into the exhaust gas conduit 22.

Figure 2:
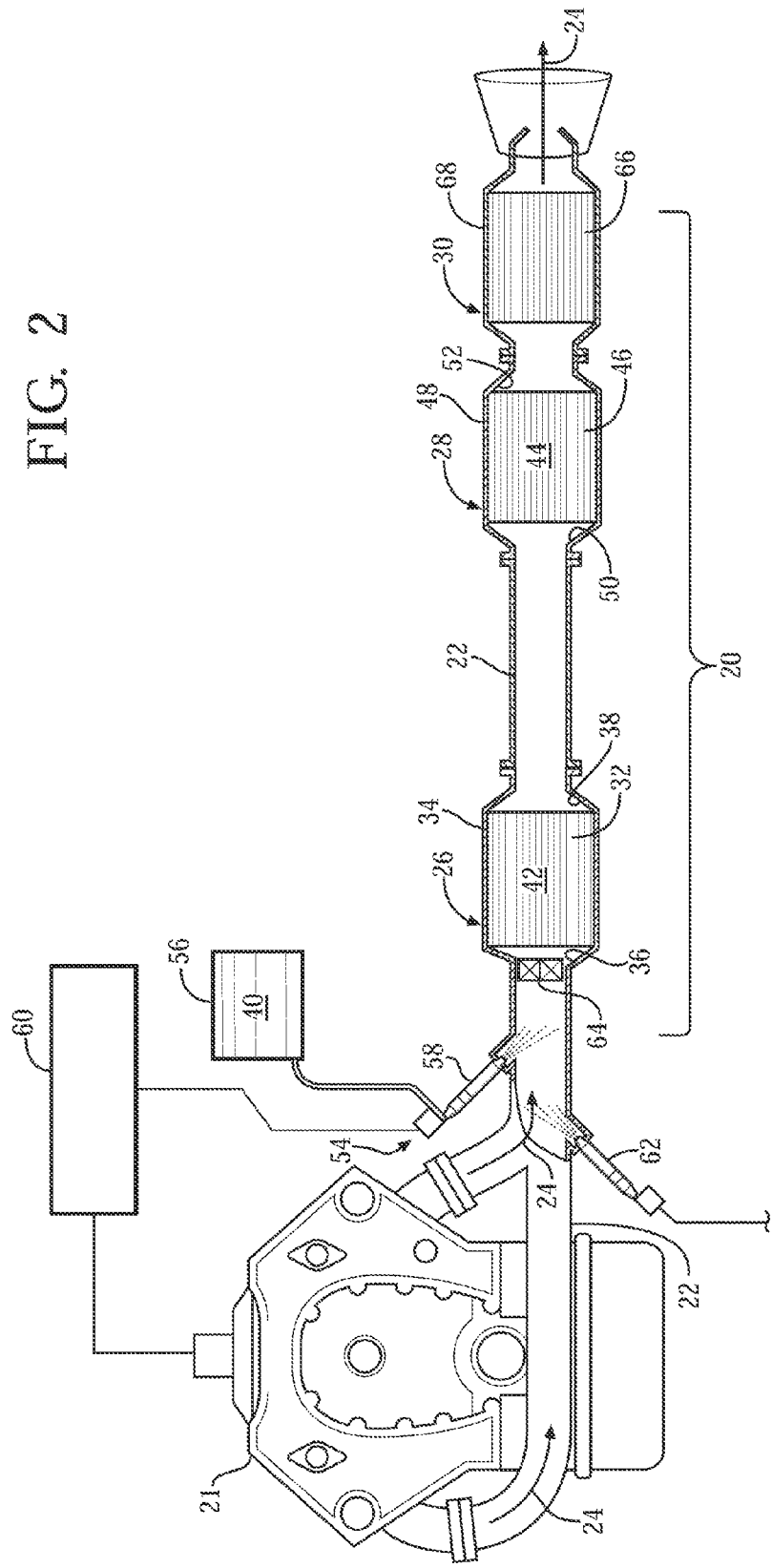
FIG. 2 is a schematic diagram showing an alternative embodiment of the exhaust gas treatment system

Referring to FIG. 1, hydrocarbons for reaction in the DOC converter 26 are injected into the flow of exhaust gas via an in-cylinder post fuel injection process. The in-cylinder post fuel injection process is known to those skilled in the art, and is therefore not described in detail herein. Referring to FIG. 2, hydrocarbons for reaction in the DOC converter 26 are injected into the flow of exhaust gas via a hydrocarbon injector 62 of an in-exhaust hydrocarbon injection process. The hydrocarbon injector 62 is disposed downstream of the reductant injector 58, and upstream of the DOC converter 26. The in-exhaust hydrocarbon injection process is known to those skilled in the art, and is therefore not described in detail herein. A mixer 64 is disposed in the exhaust gas conduit 22 downstream of the hydrocarbon injector 62 and the reductant injector 58, and upstream of the DOC converter 26. The mixer 64 is operable to mix hydrocarbons injected into the exhaust gas conduit 22 with the flow of exhaust gas.

The DPF device 30 operates to filter carbon and other particulate matter from the flow of the exhaust gas. The DPF device 30 may be constructed using a filter substrate 66. As shown in FIG. 2, the filter substrate 66 may be packaged in a rigid canister 68 as a single unit. As shown in FIG. 1, the filter substrate 66 is packaged in the rigid canister 34 of the DOC converter 26. The filtered particulate matter is deposited on the filter substrate 66. The DPF device 30 is regenerated periodically to burn off the accumulated particulate matter. Regeneration of a DPF device 30 is typically automatic and is controlled by an engine or other suitable controller 60 based on signals generated by engine and exhaust system sensors. The regeneration event involves increasing the temperature of the filter substrate 66, typically by the exothermic reaction occurring on the DOC converter 26, to levels that are often above 600° C. in order to burn the accumulated particulate matter.

Referring to FIG. 1, the DPF device 30 is disposed in the rigid canister 34 of the DOC converter 26, upstream of the SCR device 28. Accordingly, the DOC converter 26 and the DPF device 30 are integrally formed as a single unit to define a close-coupled DOC converter/particulate filter having an upstream portion forming the DOC converter 26, and a downstream portion forming the particulate filter. Referring to FIG. 2, the DPF device 30 is shown as a separate and distinct exhaust treatment device, disposed downstream of the SCR device 28. However, it should be appreciated that the SCR device 28 and the DPF device 30 may be integrally formed as a single unit, i.e., a Selective Catalyst Reduction Filter (SCRF).

The filter substrate 66 of the DPF device 30 may include an oxidation catalyst composition dispersed therein. The addition of the oxidation catalyst composition to the DPF device 30 provides a 2-way exhaust treatment device that is capable of reducing regulated components of the exhaust gas, i.e., hydrocarbons and carbon monoxide, as well as removing carbon and other particulate matter. If the particulate filter is disposed upstream of the SCR device 28, such as shown in FIG. 1, and includes an oxidation catalyst compound, then the oxidation catalyst compound of the DPF device 30 is an ammonia-neutral oxidation catalyst compound 72 that does not react with the ammonia reductant 40 in the flow of exhaust gas. The ammonia-neutral oxidation catalyst compound 72 on the DPF device 30 allows the ammonia reductant 40 to pass through the DPF device 30 for reaction with the selective catalytic reduction composition 44 in the SCR device 28. The ammonia-neutral oxidation catalyst compound 72 of DPF device 30 may include palladium (Pd), base metals (Ce, Cu, Mo, Fe, Mn, La etc.), alkali metals (Na, K), or any combination of palladium, base metals and alkali metals. The ammonia-neutral oxidation catalyst compound 72 of the DPF device 30 oxidizes the hydrocarbons, carbon monoxide and particulate matter (soot) in the exhaust gas, in an exothermic reaction, to form carbon dioxide and water, while allowing the ammonia reductant 40 in the exhaust gas to pass through the DPF device 30. It should be appreciated that the DPF device 30 need not include an oxidation catalyst compound. The un-catalyzed DPF device 30 is, by nature, ammonia neutral, and the ammonia reductant 40 may pass through the particulate filter.

If the DPF device 30 is disposed downstream of the SCR device 28, such as shown in FIG. 2, and includes an oxidation catalyst compound, then the oxidation catalyst compound of the particulate filter may include some other compound that may or may not react with the ammonia reductant 40 in the exhaust gas.

Both embodiments of the exhaust gas treatment system 20 shown in FIGS. 1 and 2 inject the ammonia reductant 40 into the flow of exhaust gas upstream of the DOC converter 26, and include the SCR device 28 disposed downstream of the DOC converter 26. The ammonia-neutral oxidation catalyst compound 42 of the DOC converter 26 does not react with the ammonia reductant 40 injected into the flow of exhaust gas, thereby allowing the ammonia reductant 40 to pass through the DOC converter 26, and into the SCR device 28. The ammonia reductant 40 mixes with the exhaust gas while flowing through the DOC converter 26, equipped with the corrugated metallic substrate or a similar substrate with mixing enhancement capabilities, prior to reaching the SCR device 28, thereby reducing the length of the exhaust gas treatment system 20, which allows the exhaust gas treatment system 20 to be incorporated into smaller vehicles, such as passenger cars, vans, and light duty pick-up trucks.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An exhaust gas treatment system for a diesel engine, the exhaust gas treatment system comprising:
an exhaust gas conduit in fluid communication with a diesel engine for receiving a flow of exhaust gas from the diesel engine;
a Selective Catalytic Reduction (SCR) device having an inlet and an outlet in fluid communication with the exhaust gas conduit, and including a selective catalytic reduction composition for reducing oxides of nitrogen in the flow of exhaust gas in the presence of an ammonia reductant;
a Diesel Oxidation Catalyst (DOC) converter having an inlet and an outlet in fluid communication with the exhaust gas conduit and disposed upstream of the selective catalyst reduction device in the exhaust gas conduit; and
a Diesel Emission Fluid (DEF) dosing system including an injector in fluid communication with the exhaust gas conduit and disposed upstream of the DOC converter in the exhaust gas conduit;
wherein the DEF dosing system is operable to inject the ammonia reductant into the flow of exhaust gas upstream of the DOC converter; and
wherein the DOC converter includes an ammonia-neutral oxidation catalyst compound operable to oxidize hydrocarbons and carbon monoxide in the flow of exhaust gas, while not reacting with the ammonia reductant in the flow of exhaust gas to allow the ammonia reductant to pass through the DOC converter for reaction with the selective catalytic reduction composition in the SCR device.

2. An exhaust gas treatment system as set forth in claim 1 wherein the DOC converter includes a substrate supporting the ammonia-neutral oxidation catalyst compound thereon.

3. An exhaust gas treatment system as set forth in claim 2 wherein the substrate of the DOC converter operable to mix the ammonia reductant with the flow of exhaust.

4. An exhaust gas treatment system as set forth in claim 3 wherein the substrate of the DOC converter is a corrugated metallic substrate.

5. An exhaust gas treatment system as set forth in claim 2 wherein the substrate of the DOC converter is operable to mix and vaporize the ammonia reductant prior to the ammonia reductant reaching the SCR device.

6. An exhaust gas treatment system as set forth in claim 1 wherein the ammonia-neutral oxidation catalyst compound of the DOC converter includes palladium, base metals, alkali metals, or any combination of palladium, base metals and alkali metals.

7. An exhaust gas treatment system as set forth in claim 1 further comprising a Diesel Particulate Filter (DPF) device in fluid communication with the exhaust gas conduit and operable to filter particulate matter from the flow of exhaust gas.

8. An exhaust gas treatment system as set forth in claim 7 wherein the DPF device is disposed upstream of the SCR device in the exhaust gas conduit.

9. An exhaust gas treatment system as set forth in claim 8 wherein the DPF device includes an ammonia-neutral oxidation catalyst compound that does not react with the ammonia reductant in the flow of exhaust gas to allow the ammonia reductant to pass through the particulate filter device for reaction with the selective catalytic reduction composition in the SCR device.

10. An exhaust gas treatment system as set forth in claim 9 wherein the ammonia-neutral oxidation catalyst compound of the DPF device includes palladium, base metals, alkali metals, or any combination of palladium, base metals and alkali metals.

11. An exhaust gas treatment system as set forth in claim 9 wherein the DOC converter and the DPF device are integrated as a single unit to define a close-coupled DOC converter/DPF device having an upstream portion forming the DOC converter and a downstream portion forming the particulate filter.

12. An exhaust gas treatment system as set forth in claim 1 further comprising a mixer disposed in the exhaust gas conduit downstream of the injector and upstream of the DOC converter, wherein the mixer is operable to mix hydrocarbons injected into the exhaust gas conduit with the flow of exhaust gas.

13. A method of treating exhaust gas from a diesel engine, the method comprising:
injecting ammonia reductant into a flow of exhaust gas upstream of a Diesel Oxidation Catalyst (DOC) converter having an ammonia-neutral oxidation catalyst compound operable to oxidize hydrocarbons and carbon monoxide in the flow of exhaust gas, while not reacting with the ammonia reductant in the flow of exhaust gas, to allow the ammonia reductant to pass through the DOC converter; and reacting the ammonia reductant in the flow of exhaust gas with a selective catalytic reduction composition in a Selective Catalytic Reduction (SCR) device disposed downstream of the DOC converter to reduce oxides of nitrogen in the flow of exhaust gas.

14. A method as set forth in claim 13 wherein the DOC converter includes a corrugated metallic substrate supporting the ammonia-neutral oxidation catalyst compound thereon and operable to mix and vaporize the ammonia reductant injected into the flow of exhaust gas prior to the ammonia reductant reaching the SCR device.

15. A method as set forth in claim 13 further comprising filtering particulate matter from the flow of exhaust gas with a Diesel Particulate Filter (DPF) device disposed downstream of the DOC converter and upstream of the SCR device.

16. A method as set forth in claim 15 wherein the DPF device includes an ammonia-neutral oxidation catalyst compound operable to oxidize hydrocarbons and carbon monoxide in the flow of exhaust gas, while not reacting with the ammonia reductant in the flow of exhaust gas, to allow the ammonia reductant to pass through the particulate filter device.

17. A method as set forth in claim 13 further comprising injecting hydrocarbons into the flow of exhaust via an in-cylinder post fuel injection process.

18. A method as set forth in claim 13 further comprising injecting hydrocarbons into the flow of exhaust gas via an in-exhaust hydrocarbon injection process.

19. A method as set forth in claim 18 further comprising mixing the hydrocarbons injected into the flow of exhaust gas with mixer disposed upstream of the DOC converter.

* * * * *